W. B. YEAKEL.
MEAT CHOPPER.
APPLICATION FILED JULY 16, 1908.
970,593.
Patented Sept. 20, 1910.
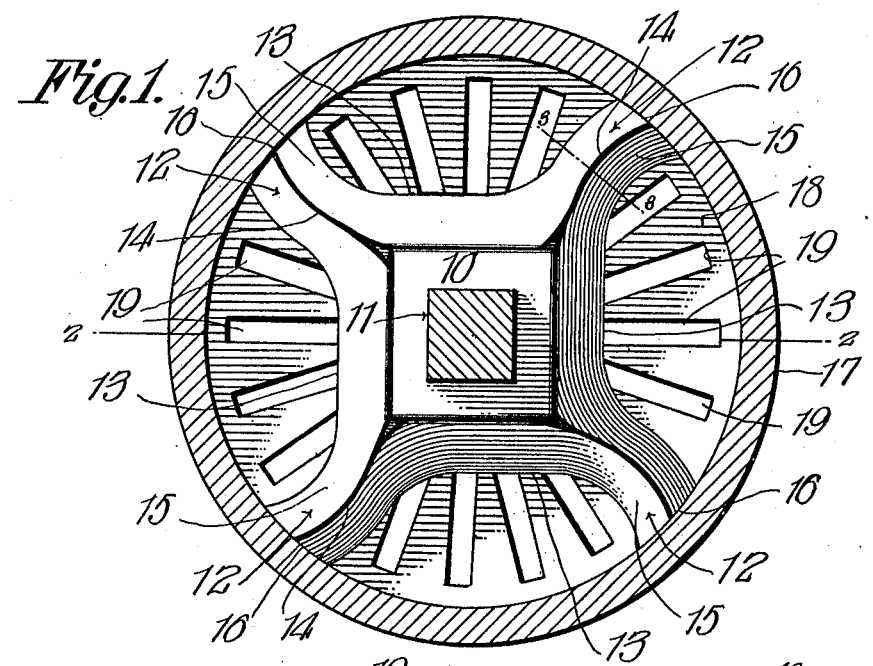
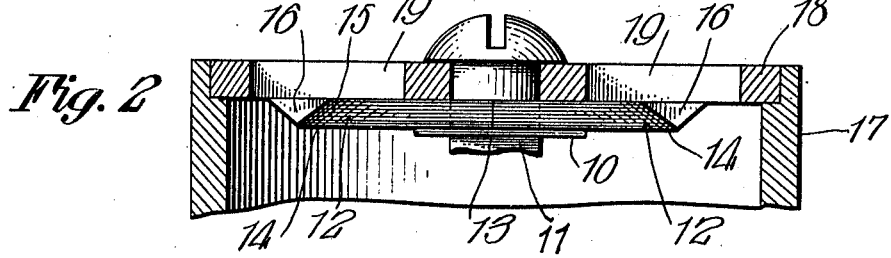
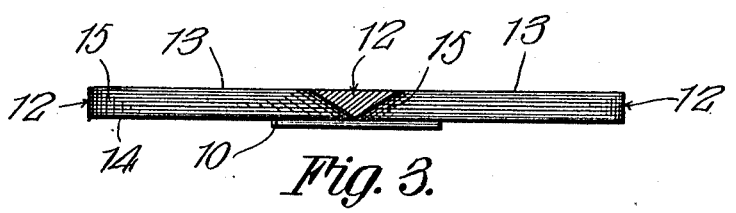
Witnesses
Chas. C. Richardson,
C. N. Woodward.
Inventor
William B. Yeakel,
By Chandler & Chandler
Attorneys

UNITED STATES PATENT OFFICE.

WILLIAM B. YEAKEL, OF COOPERSBURG, PENNSYLVANIA.

MEAT-CHOPPER.

970,593. Specification of Letters Patent. Patented Sept. 20, 1910.

Application filed July 16, 1908. Serial No. 443,908.

*To all whom it may concern:*

Be it known that I, WILLIAM B. YEAKEL, a citizen of the United States, residing at Coopersburg, in the county of Lehigh, State of Pennsylvania, have invented certain new and useful Improvements in Meat-Choppers; and I do hereby declare the following to be a full, clear, and exact description of the invention, such as will enable others skilled in the art to which it appertains to make and use the same.

This invention relates to meat choppers of the class in which rotating cutting members are employed having rotating arms formed with cutting edges, and has for one of its objects to simplify and improve the construction of the chopper member and to increase the efficiency and utility, and avoid the tendency of devices of this character as ordinarily constructed to grind the material outwardly against the casing and thus retard the operation.

Another object of the invention is to produce a simply constructed device having double cutting blades, so that by reversing the movement the discharge apertures may be more readily cleared from obstructing material.

With these and other objects in view the improved device consists generally in a hub, preferably rectangular, and adapted to be attached to a drive shaft with an arm extending from each corner of the hub and forming continuations of the four sides of the same, with cutting edges along both sides of each arm and with the outer portions curving with the knife edges continued throughout the curved portions and with the terminals of the arms concentric to the axial line of the shaft, so that as the knife is rotated in one direction the material is drawn toward the hub and all tendency of the material to be forced outwardly and ground against the casing is obviated, while at the same time the concentric outer faces of the arms scrape the interior of the casing and prevent clogging. And by reversing the movement the curved arms operate in the opposite direction and cause their cutting edges to clear the slots 19 from obstruction, and effectually prevent any tendency to clog the slots as hereafter more fully explained.

The invention consists in certain novel features of construction as hereafter shown and described and then specifically pointed out in the claims, and in the drawings illustrating the preferred embodiment of the invention—

Figure 1 is a side elevation of one of the improved chopper devices arranged within its casing, the casing being in section. Fig. 2 is a transverse section enlarged on the line 2—2 of Fig. 1. Fig. 3 is an edge view of the knife element detached with one of the cutting blades in section on the line 3—3 of Fig. 1.

Much annoyance has been experienced heretofore in the operation of meat choppers from the tendency of the chopping device to crowd the material against the casing and produce a grinding action rather than a cutting action, and the principal object of the present invention is to obviate these objections by forming the cutter so that it produces a cutting action upon the material at all points of the action and at the same time scrapes adhering material from the interior of the casing.

In devices of this character the discharge slots are liable to become clogged with the material, and great difficulty is experienced sometimes in clearing the slots, but with applicant's improved device when the slots become clogged the motion of the member 10 is reversed with the effect of causing the curved edges of the arms 12 to operate in the opposite direction over the slots and force the material outwardly, and thus effectually clear the slots by reversing the cutting action. This is an important feature of applicant's device and adds materially to its efficiency and utility.

The improved device comprises a hub preferably rectangular and engaging a correspondingly rectangular shaft, the hub being provided with an arm extending at each corner and in alinement with its sides with the outer portions of the arms curving outwardly, the arms having cutting edges at their outer sides and the curved portion likewise having cutting edges on both sides and continuing the cutting edges of the arms, whereby when the hub is rotated in one direction one set of the cutting edges pass over the cutter plate in curved lines and operate to move the material toward the center of the hub, and thus obviate any tendency to move the material toward the casing. An effectual cutting action thus results and all tendency to grind or crowd the material against the casing is obviated.

The improved chopper thus requires much less power to operate it than when the arms are formed in straight radial lines and without the curved portions, as will be obvious.

In the drawings the hub portion is represented at 10, preferably square and fitting over a square shaft 11 and the curving, extended arms represented at 12 with the cutting edges at 13, the outer portions of the arms curving outwardly as at 14 and with corresponding curving cutting edges 15 merging into the cutting edges 13 of the arms, with the terminals of the arms concentric to the axial line of the hub and the shaft as at 16 so that the terminals of the arms move in close contact with the interior of the casing represented at 17. The cutting or chopping element is arranged to operate against a face plate indicated at 18 provided with radially disposed apertures 19 through which the cut material is forced by the action of the feeders operating in the rear of the chopper, the feeders not being shown as they form no part of the present invention and as their construction is so well known.

By this simple arrangement it will be obvious that as the chopper rotates in one direction the material is crowded against the face plate 18, and the improved chopper by the action of the feeders is crowded through the apertures 19 and the rotating knives cut the material against the edges of the apertures and severs it, and at the same time crowds the material inwardly toward the hub and away from the casing and thus obviates the tendency of the arms to crowd the material against the interior of the casing. This action relieves the chopper from a relatively large amount of the strain and resistance and decreases the power required to operate it. The device thus runs much more easily than with the ordinary form of chopper.

It will be noted that the cutting action is of the "shearing" form, the shearing action being inwardly toward the hub by the curved form of the outer portions of the cutting members and such shearing action takes place whether the head 10 is moved forward to produce the cutting action upon the material, or reversed in motion to effect the clearing of the slot 9, as above described.

The concentric end 16 of the arms is also an important feature of the invention and adds materially to its efficiency and utility as the interior of the casing is thus automatically cleared of any adhering material which would otherwise retard the action.

The improved device is simple in construction, and can be manufactured without increased expense. The cutting device may be of any required size and any required number of the arms may be employed upon each hub but generally four of the arms will be employed, as shown.

What is claimed, is:—

1. A cutter for meat choppers comprising a central hub formed with a plurality of angular sides each having a continuous cutting edge, and curved arms extending from said hub at the juncture of the angular sides and forming continuations of the same, said arms having cutting edges on both sides and merging into the cutting edges of the hub, so that the cutting edges of the arms and of the hub are continuous from end to end, whereby when the cutter is rotated in one direction the food will be cut and moved outwardly away from the hub and will be cut and moved inwardly toward the hub when the cutter is rotating in the opposite direction.

2. The combination with a disk having a plurality of radially arranged slots, of a cutter arranged to rotate over said disk and comprising a central hub formed with a plurality of angular sides each having a continuous cutting edge and curved arms extending from said hub at the juncture of the angular sides and forming curved continuations of the same, said arms having cutting edges on both sides and merging into the cutting edges of the hub, so that the cutting edges of the arms and of the hub are continuous from end to end, whereby when the cutter is rotated in one direction over the slotted disk the food will be cut across the slots and carried outwardly and will be cut across the slots and carried inwardly when the cutter is rotated in the other direction.

In testimony whereof, I affix my signature in presence of two witnesses.

WILLIAM B. YEAKEL.

Witnesses:
WILLIAM S. FRANKENFIELD,
JOHN H. YEAKEL.